Figure 1:
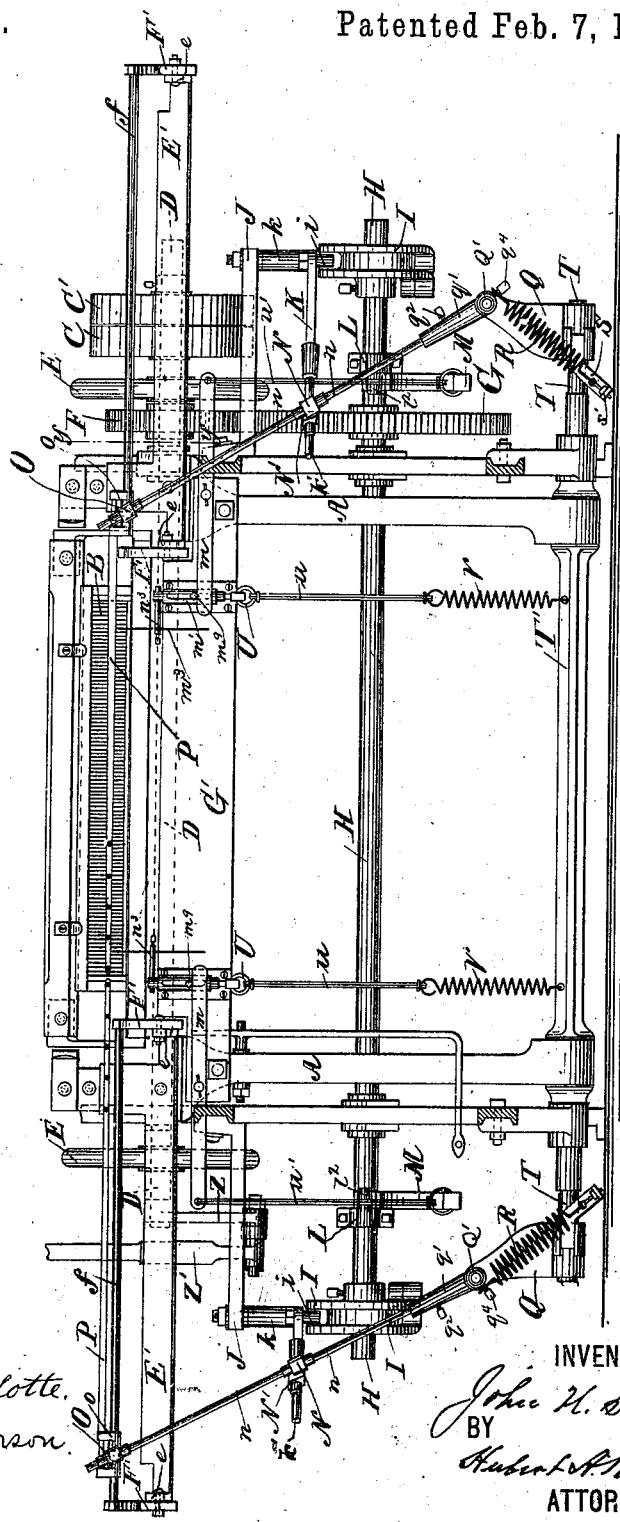

(No Model.)

4 Sheets—Sheet 1.

J. N. STEARNS.
NEEDLE LOOM.

No. 377,535. Patented Feb. 7, 1888.

WITNESSES:
Edw. F. Tourtellotte.
Wallace H. Pearson.

INVENTOR
John N. Stearns,
BY
Hubert H. Banning
ATTORNEY (No Model.) 4 Sheets—Sheet 2.

J. N. STEARNS.
NEEDLE LOOM.

No. 377,535. Patented Feb. 7, 1888.

WITNESSES:
Edw. F. Tourtellotte.
Wallace H. Pearson.

INVENTOR
John N. Stearns,
BY
Hubert A. Banning
ATTORNEY (No Model.) 4 Sheets—Sheet 3.
J. N. STEARNS.
NEEDLE LOOM.
No. 377,535. Patented Feb. 7, 1888.
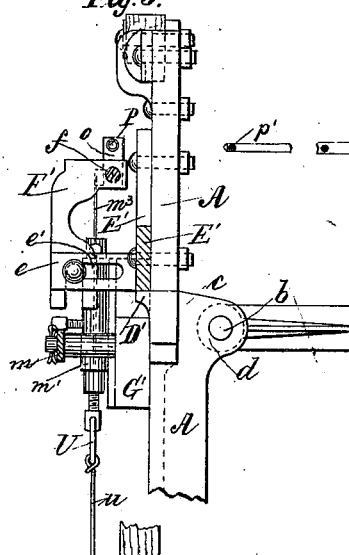
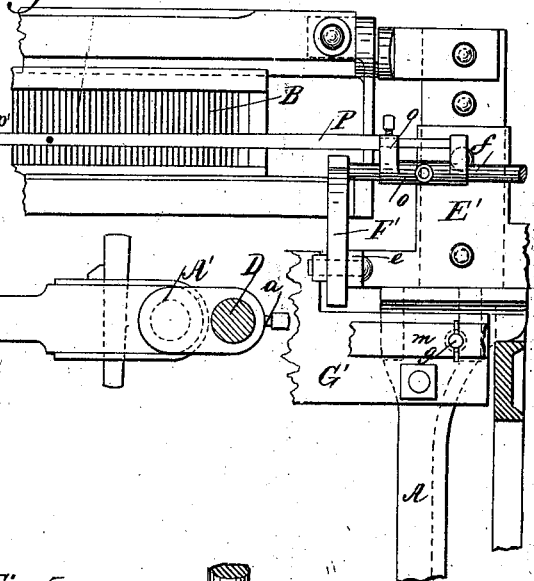
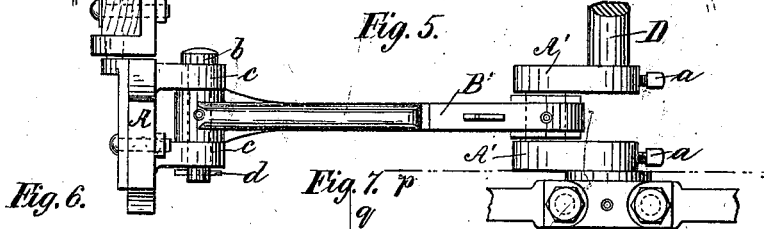
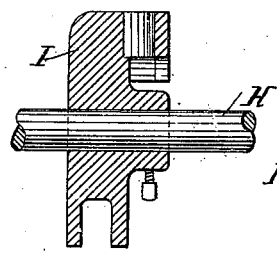
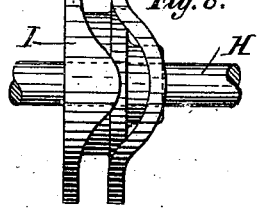
WITNESSES:
Edw. F. Tourtellotte.
Wallace H. Pearson.
INVENTOR
John N. Stearns.
BY
Hubert A. Banning
ATTORNEY (No Model.)　　　　　J. N. STEARNS.　　　4 Sheets—Sheet 4.
NEEDLE LOOM.
No. 377,535.　　　　　　　　　　Patented Feb. 7, 1888.
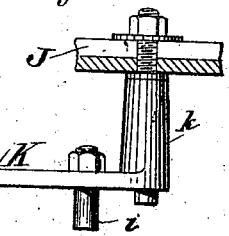
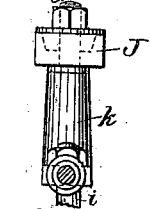
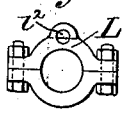
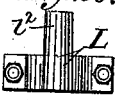
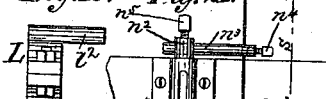
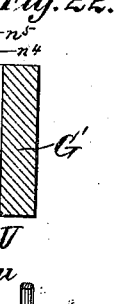
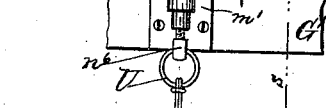
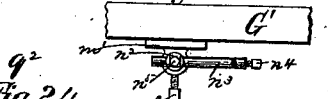
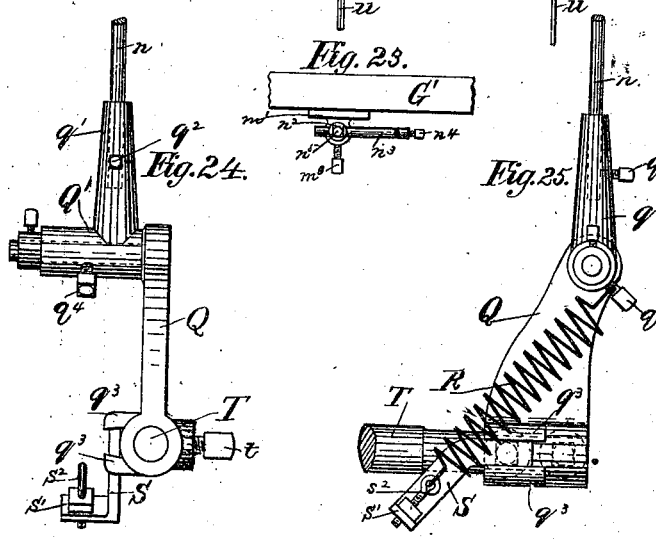
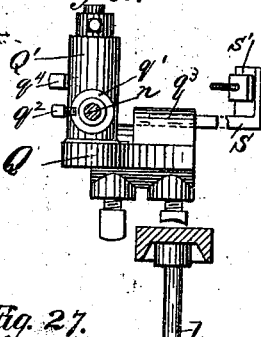
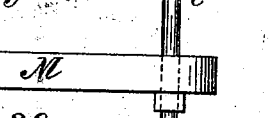
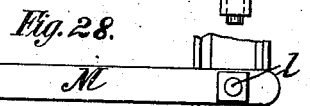
WITNESSES:
Edw. F. Tomtellotte
Wallace H. Pearson.
INVENTOR
John N. Stearns
BY
Hubert A. Banning
ATTORNEY

UNITED STATES PATENT OFFICE.

JOHN N. STEARNS, OF NEW YORK, N. Y.

NEEDLE-LOOM.

SPECIFICATION forming part of Letters Patent No. 377,535, dated February 7, 1888.

Application filed September 11, 1886. Serial No. 213,289. (No model.)

*To all whom it may concern:*

Be it known that I, JOHN N. STEARNS, of the city of New York, county and State of New York, have invented certain new and useful Improvements in Needle-Looms, of which the following is such a full, clear, concise, and exact description as will enable others skilled in the art to which my invention appertains to make and use the same, reference being had to the accompanying drawings, forming part of this specification.

The objections to the use of heavy shuttles— the weight of which, notwithstanding their rapid movement through the shed, strains and at times breaks some of the warp-threads— has led to a number of attempts to construct a different form of weft-carrier, which, in most instances, has been in the nature of a needle. It is to that class of looms in which a needle is employed to carry the weft or filling through the shed formed by the decussations of the warp that my invention relates, and it is more especially applicable to looms for weaving silk and similar fabrics.
In most needle-looms heretofore constructed a single needle playing from one end of the lay has been employed, and generally in connection therewith a shuttle has been used for the purpose of passing a selvage-thread through the loop formed by the weft at the edge opposite that from which the needle enters the shed. With a single needle the selvage will not be made the same at both sides of the fabric, and in using a shuttle in connection with it there is always more or less difficulty in regulating the passage of the shuttle through the loop or in passing the loop over the shuttle if the same be stationary, and the loom must be stopped whenever the shuttle needs to be replenished with thread. In other looms a so-called "finger" has been employed to carry the filling half-way through the shed, at which point the finger was met by a hook entering from the opposite side for the purpose of seizing the filling and taking it the rest of the way while the finger was returning to its original position at the end of the lay. Such looms do not, however, weave a fabric with both selvages alike, and in addition to this objection difficulties are liable to be encountered should the hook fail to catch the weft at the precise instant when it should pass from the finger to the hook.

It has also been proposed to employ two needles, each provided with a finger to hold the weft, such needles being made to enter the shed at or about the same time from opposite ends of the lay, each needle with its finger being made to carry a weft-thread which forms a loop at the point where the needles meet in the shed, the loops from both fingers being caught by pins which pass through the reed and retain the filling in a position to be beaten up. This form of weft-carrier necessitates a juncture of the double ends of the filling at some point between the edges of the fabric, and, no matter whether the juncture is at the same point with each pick or is varied by alternate movements of the needles respectively to a greater or less extent, the double ends will show in the completed fabric, which is rendered imperfect and less durable than in cases where each weft is carried entirely through the shed.

Attempts have also been made to employ weft-carriers consisting of forked blades formed on the free ends of elastic spring-blades wound upon disks to which the other ends of the spring-blades were secured, the disks being attached to each end of the lay. With this construction it was proposed to project the forked end by the unwinding of the spring-blade from its disk along the front of the lay, between a series of double finger-guides, and through the shed. Such weft-carriers were not, however, provided with any means for retaining the weft-thread other than hooks which in passing should catch the weft when lifted for that purpose by the Jacquard or other means. Many objections might be mentioned to the use of such disks and spring-blades; but a sufficiently serious one is the faulty mechanical construction of the device. The length and elasticity of the spring-blades render them subject to an undulating and tremulous movement, which would occasion annoyance even if the contrivance could be made to operate at all. It wants that quick and positive movement without which no weft-carrier can properly perform its function.

It may be stated as a fact that none of the devices of the character already mentioned and no other form of needle-loom of which I am aware possess the elements necessary for the production of a fabric with the same rapidity and degree of perfection as do looms having a shuttle-weft carrier, and this notwithstanding the objections to the shuttle movement which have long been experienced and are well known.

The object of my invention is to overcome the objections which prevail against the use of already-existing weft-carriers; and to this end my invention consists in the construction and combination of parts, as indicated by the claims appended to this specification.

The drawings represent such parts of a loom provided with my improvements as are necessary to illustrate the new features embodied in its construction.

Figure 2:
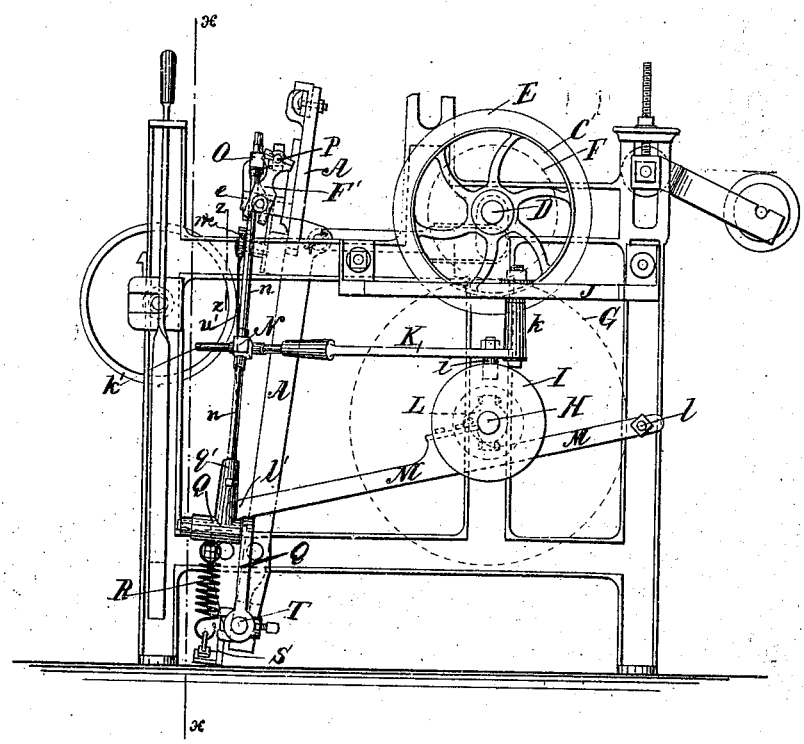

Figure 1 is a front view of so much of the loom as appears when the cloth-beam and the connections on a line therewith are removed by the cutting of the frame on the line $x\,x$ of Fig. 2. This figure (1) shows the lay and its connections with the loom, the two needles and their operating mechanism, and also the means for retaining the loop of the filling, which is formed whenever one of the needles is passed through the shed. The healds and harness are not shown, as their operation and the formation of the shed are well understood. In this figure, however, the crank Z, secured to the driving-shaft D, is shown. This crank transmits motion to the harness through the lever Z', which is shown as having the upper portion broken away. Fig. 2 is a right-hand end view of the loom, and shows the lay in a position which permits of the passage of one of the needles through the shed. Fig. 3 is a partial vertical transverse section on line $y\,y$, Fig. 1, with part of the frame broken away, and with the driving-shaft in section on line $p\,p$, Fig. 5. Fig. 4 is a longitudinal section taken on line $z\,z$, Fig. 2, showing a portion of the reed; also, one of the needles and certain other details. Fig. 5 is a detail plan view illustrative of the mechanism for operating the lay of the parts shown by Fig. 3. Fig. 6 is a vertical section with the shaft in elevation, taken on the line $q\,q$ of Fig. 7, which latter figure is an end view of the disk or wheel I, having a cam-groove upon its periphery, and which disk is secured to the shaft H, shown in cross-section. Fig. 8 is a plan of the cam L and part of shaft H. Fig. 9 is an end view of the bracket F', to which the rod $f$ is secured, as shown in Fig. 1, and a portion of the support for the said brackets; and Fig. 10 is a plan view of the same. Fig. 11 is a front elevation of the needle-carrier $o$ and a part of its supporting-rod, and Fig. 12 is a transverse vertical section to show the details of and means for connecting the slip-joint O and needle-carrier, while Fig. 13 is a plan view of the parts shown by Fig. 11. Figs. 14 and 15 are respectively end and plan views of the slip-joint O, which is attached to the needle-carrier $o$. Fig. 16 is a side elevation of the elbow-lever K, (shown in Figs. 1 and 2,) and Fig. 17 is a transverse section of the same through the line $r\,r$ of Fig. 16. Figs. 18, 19, and 20 are respectively front, side elevation, and plan views of the cam-connection L, secured to the shaft H, as shown in Figs. 1 and 2. Figs. 21 and 23 are respectively a front elevation and plan view of the device for holding the loop-retaining pin $m^3$ and supports for said device; and Fig. 22 is a vertical transverse section through the line $s\,s$, Fig. 21. Figs. 24, 25, and 26 are respectively side, front elevation, and plan views of the bracket Q, which oscillates on the lay-shaft T and parts adjacent to the said bracket. Figs. 27 and 28 are respectively side elevation and plan views of the lever M, which actuates the mechanism for operating the loop-retaining pin $m^3$ and the support for the said lever. Fig. 29 is a detail sectional view to show the connection of the slip-joints N and N'.

In the drawings the same reference-letters indicate corresponding parts whenever repeated.

A A represent the uprights of the lay; B, the reed of the same.

C C' are respectively fast and loose pulleys on the driving-shaft D.

The mechanism for operating the lay does not differ materially from that ordinarily used, but certain details thereof are shown in Figs. 3, 4, and 5. The crank-arms A' are secured to the divided driving-shaft D by the set-screws $a$, said crank-arms thus forming a practical continuation of said shaft. Connected to the pin joining these crank-arms is a pitman, B', which extends to and connects by a bolt, $b$, to the projecting ears or lugs $c\,c$, the bolt being held by a split pin, $d$. The pitman B' gives an oscillating motion to the lay, which drives up the weft-threads after they are introduced.

E represents a hand-wheel; F, a toothed pinion operated by the driving-shaft and gearing with the toothed wheel G, which gives motion to the cam-shaft H, upon which the disks I and cams L are secured. The contour of the cam-groove of a disk I appears more clearly in Figs. 7 and 8, which are details of the same. In the cam-groove a pin, $i$, (shown in Figs. 1, 2, 16, and 17,) slides and gives motion to an elbow-lever, K, the form of which is shown by the detail, Figs. 16 and 17. This elbow-lever K has a vertical arm, $k$, which is secured to a bracket, J, extending outwardly from the frame of the loom. This elbow-lever K is also provided with a round extension-bar, $k'$, which receives a slip-joint, N', such joint being secured by a threaded stud, N², to another slip-joint, N, (see Fig. 29,) which slides upon an oblique rod, $n$. (Shown in Fig. 1.) At the upper end of the oblique rod $n$ is another slip-joint, O, the details of which are shown in Figs. 12, 14, and 15. The slip-joint O (see Fig. 12) is provided with an inner projecting boss, $h^2$, (shown in the detail figures,) and into which boss a threaded stud, $o^2$, passes, such stud being made to connect with the needle-carrier $o$.

Resting upon a projecting flange, D', Fig. 3, of the lay-upright A is an extension angle-iron, E', at each end of which is a projecting arm, $e$, the same being slotted, as shown at $e'$ in Figs. 3 and 9, and bolted to this arm $e$ through the slot $e'$ is a vertical bracket, F', the form of which appears in Fig. 3. The brackets F' support a horizontal rod, $f$, upon which slides the needle-carrier $o$. The construction of the needle-carrier is shown in Figs. 11, 12, and 13 as consisting of a slide having two upwardly-projecting lugs, $h\ h$, to which the needle P is secured by a set-screw or other means. Each end of the lay is provided with the same form of needle-carrier, needle, and operating devices.

At the side and center of the carrier $o$ and integral with it is a projecting boss, $h'$, Figs. 12 and 13, which has a female thread, and into which passes a threaded stud, $o^2$, the same being secured to an inner projecting boss, $h^2$, of the slip-joint O. (Shown in Figs. 12, 14, and 15.)

The oblique rod $n$ is secured at its lower end in an arm, $q'$, of a sleeve, Q', by a set-screw, $q^2$, the said sleeve being hinged or journaled on an arm of a bracket, Q, as shown in Figs. 24, 25, and 26. At the lower portion of the bracket Q are two dovetailed lugs, $q^3\ q^3$, (best shown in Fig. 24,) and fitting in this dovetail is an angle-piece, S, which has at its lower extremity a projection, $s'$, to which is secured a screw-eye, and a spring, R, is made fast at one end in the eye of the screw $s^2$, the other end of such spring being attached to a screw, $q^4$, on the sleeve Q'. The lower end of the bracket Q is made fast to the lay rock-shaft T by a screw, $t$. The purpose of the spring R is to retract the sleeve Q' relatively to the bracket Q, so as to take up a certain looseness which is desirable between these parts as the former is vibrated from the elbow-lever K.

When the shaft H is set in motion by the gear-wheels F G, the disk I, having the cam-groove upon it, revolves with it, and the pin $i$, which is made fast to the elbow-lever K, travels the course of the groove and actuates the elbow-lever, upon the extension-rod $k'$ of which the slip-joint N' slides, and by its connection with the slip-joint N motion is imparted to the rod $n$. This gives motion also to the slip-joint O, which connects with the needle-carrier $o$ and causes the same to slide upon the rod $f$, the said needle-carrier $o$ having a free movement, because the stud $o^2$, which secures the slip-joint O, is allowed to turn within its bosses, thus accommodating itself to any position which the slip-joint O may assume as the rod $n$ oscillates. This movement is also unaffected by the swinging of the lay, as the sleeve Q' $q'$, to which the rod $n$ is secured, is journaled to the bracket Q, which moves upon the lay-shaft. Thus the arrangement of the needle carrier and its operating mechanism is adapted to give a rapid and positive movement to the needles.

The mechanism is the same at each end of the lay; but an alternate movement through the shed is given to the needles by the arrangement of the cam-grooves upon the disks I, which operate the elbow-levers K. These cam-grooves give no motion during a certain portion of the travel of the pin $i$, and this permits of a variation as to the time when the needles start, and also allows the lay to swing forward and beat up the weft and return between the time when one needle has passed out of the shed and the other one enters the succeeding shed.

The two needles are made so as to taper slightly toward the point and of sufficient length to carry the weft the entire width of the fabric, and each is rigidly secured to its carriers $o$, so as to have a steady movement. Toward the point they are preferably perforated in several places, as shown at $p'\ p'$, in order that the weft-thread may be passed through these perforations, and thus a tension is secured in a simple and effective manner. As the needles introduce the weft alternately into the same ply of the fabric—that is, one needle passes it in every other shed, while the other takes it through those not filled by the first—it will at once be seen that the loops at each side of the fabric are covered, after being beaten up, by the weft which enters from that side. This produces like selvages on both sides of the fabric. It is, however, desirable in order to secure a complete and perfect protection of the loops that they should always be formed at the same point, which may or may not be precisely at the edge. I find it advantageous to form the loops a slight distance inward from the edge, thus leaving several selvage-threads filled only by the weft which enters from that side.

A very good effect may be produced in this manner by using heavier or twisted warp-threads for the edging beyond the point at which the loops are formed, because in such case these warp-threads compensate for any looseness which might possibly otherwise appear should the selvage-warp be of the same weight as the body of the fabric.

In order to secure uniformity in the formation of the loops, I make use of pins $m^3$, such pins being set at each edge of the fabric, or as near thereto as it may be determined to have them. To the shaft H are secured collars L, provided with arms or tappets $l^2$, (see Figs. 1, 2, 18, 19, and 20,) each of the said arms or tappets being arranged to impinge against and thus operate a lever, M, the form of which appears more clearly in Figs. 27 and 28. This lever M is pivoted to the main frame of the loom, as shown at $l$ in Fig. 2, and the opposite end, $l'$, has a cord, $u'$, or its equivalent—as, for instance, a chain or a wire—secured thereto, and the upper end of such cord is attached to the outer end of a horizontal rocking lever, $m_a$. The oscillating movement which is communicated to the lever M through the arm $l^2$, and thence by means of the cord $u'$ to the lever $m$, produces a vertical movement of the pin $m^2$ through a slotted portion of the device $m'$, which guides the pin. This guiding device is clearly shown in Figs. 21, 22, and 23, and appears also in Fig. 3, as well as in Fig. 1.

In Figs. 3 and 4 a cross-piece, G', is shown as being bolted to the uprights A A of the lay. To this cross-piece G' the oscillating lever $m$ is pivoted at $g$, and this lever serves to impart an upward movement to the pin $m^3$. The device which holds this pin consists of a hollow cylindrical tube, $m^4$, provided with a slot, $m^5$, in which slides a set-screw, $m^9$. The set-screw $m^9$ is secured to a cylindrical bar, $n^2$, which fits within the hollow cylindrical tube $m^4$, and this bar moves vertically when actuated by the rocking lever $m$ impinging against the set-screw $m^9$.

At the extremity of the bar $n^2$ is a projecting cylindrical bar, $n^3$, which has a hole for receiving the pin $m^3$, which can be adjusted to any desired position by means of the set-screw $n^4$. The bar $n^3$ is adjustably secured to the bar $n^2$ by the set-screw $n^5$. The lower end of this bar has a screw-eye, $n^6$, through the eye of which passes a ring, U, and to this ring is attached a cord, $u$, the lower end of which is made fast to a spring, V, the opposite end of such spring being secured to the bottom bar, T', of the lay, as shown in Fig. 1.

The arm $l^2$ on the collar L actuates the lever M (from which the upward movements of the pin $m^3$ are derived) in such time as to cause the said pin to move upward just as the needle which has entered the shed from the opposite side has reached the limit of its movement and forms the loop of the filling introduced by it. The pin $m^3$ passes through this loop and retains it until the needle has receded and the lay swings forward and beats up the filling, the pin then being caused to drop down again and remain until the same needle introduces another filling. The pin at the opposite side acts in precisely the same manner with reference to the movements of the other needle. Thus the edges of the fabric are made alike on both sides, and the loops are covered and protected.

The particular arrangement of the mechanism for operating the loop-retaining pins need not be in the form or consist of all the parts described, as any operative mechanism for said pins which is the equivalent of that herein shown and described, and which will actuate them when required, may be used. It may also be proper to state that the mechanism for operating the needles which I have shown and described is that which I deem best; but the same may be varied in several respects without materially departing from the essential features of my invention, which are the employment of a rigid needle at each end of the lay made to introduce the weft, as described, and means for retaining the loops when formed at or near each edge of the fabric, as described.

It is by these elements that I am enabled successfully to produce a fabric differing materially from any heretofore made by a needle-loom, and at the same time there is a freedom from the injuries which result from the use of a shuttle-weft carrier.

Having thus described my invention, what I claim as new, and desire to secure by Letters Patent, is—

1. The combination, with the lay having ways or guides at its opposite ends, of two needle-carriers adapted to reciprocate on the said ways or guides, two needles arranged in line with each other and of proper length to reach entirely through the shed, two rods having double slip-joint connections with the said carriers, and means for vibrating said rods to operate the carriers, substantially as set forth.

2. In a loom, the combination, with the lay having at each end a needle of sufficient length to reach entirely through the shed, of two carriers for the needles, a way or slide at each end of the lay and movable therewith for each of the said carriers, two rods having double slip-joint connections with the said carriers, two levers having double slip-joint connections with the said rods, and means for vibrating said levers, whereby said carriers and needles are alternately reciprocated, substantially as set forth.

3. In a loom, the combination, with the lay having a way or guide, of a needle-carrier adapted to reciprocate thereon, a needle secured to the said carrier, a pivoted rod for operating the latter, a cam, a lever operated by said cam, and double slip-joint connections between the said lever and said rod and between the latter and the said carrier, substantially as set forth.

4. In a loom, the combination, with a needle, a carrier therefor, the lay provided with a way or guide on which the said carrier may reciprocate, a cam, an elbow-lever operated thereby, the lay-shaft, a bracket secured thereto, a rod pivotally connected with said bracket and having a slip joint connection with said carrier, and a double slip-joint connecting the said elbow-lever and rod, substantially as set forth.

5. The combination, with the lay, of the guiding rod $f$ carried thereby, the needle-carrier $o$, adapted to reciprocate on said rod, the needle P, secured to said carrier, the rod $n$, the slip-joint O, the double slip-joint N N', the elbow-lever K, the grooved cam I, the bracket Q, the sleeve Q', the spring R, and the lay-shaft, substantially as set forth.

6. In a loom, the combination, with the lay having at each end a needle and means for guiding and reciprocating the needle on the lay, of the guiding devices $m'$, having tubes $m^4$, the bars $n^2$, sliding in the tubes, the loop-retaining pins $m^3$, connected with said bars, the levers $m$, the springs V, connected with said bars, the levers M, connected with the said levers $m$, the shaft H, and the collars L, having arms or tappets $l^2$, substantially as set forth.

JNO. N. STEARNS.

Witnesses:
HUBERT A. BANNING,
EDW. F. TOURTELLOTTE.